United States Patent
Cuadra et al.

(10) Patent No.: US 9,507,638 B2
(45) Date of Patent: Nov. 29, 2016

(54) COMPUTE WORK DISTRIBUTION REFERENCE COUNTERS

(75) Inventors: Philip Alexander Cuadra, Mountain View, CA (US); Karim M. Abdalla, Menlo Park, CA (US); Jerome F. Duluk, Jr., Palo Alto, CA (US); Luke Durant, Santa Clara, CA (US); Gerald F. Luiz, Los Gatos, CA (US); Timothy John Purcell, Provo, UT (US); Lacky V. Shah, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 620 days.

(21) Appl. No.: 13/291,369

(22) Filed: Nov. 8, 2011

(65) Prior Publication Data

US 2013/0117758 A1     May 9, 2013

(51) Int. Cl.
G06F 9/455     (2006.01)
G06F 9/50      (2006.01)

(52) U.S. Cl.
CPC .................................. *G06F 9/5022* (2013.01)

(58) Field of Classification Search
None
See application file for complete search history.

(56) References Cited

U.S. PATENT DOCUMENTS

| | | | |
|---|---|---|---|
| 6,473,849 B1 * | 10/2002 | Keller et al. | 712/30 |
| 7,526,634 B1 * | 4/2009 | Duluk et al. | 712/216 |
| 8,209,702 B1 * | 6/2012 | Roytman et al. | 718/106 |
| 2003/0115245 A1 * | 6/2003 | Fujisawa | 709/107 |
| 2003/0182349 A1 * | 9/2003 | Leong et al. | 709/100 |
| 2005/0097560 A1 * | 5/2005 | Rolia et al. | 718/104 |
| 2007/0016905 A1 * | 1/2007 | Rector et al. | 718/100 |
| 2008/0184211 A1 * | 7/2008 | Nickolls et al. | 717/140 |
| 2008/0244578 A1 * | 10/2008 | Yoav et al. | 718/100 |
| 2010/0162247 A1 * | 6/2010 | Welc et al. | 718/101 |
| 2010/0269110 A1 | 10/2010 | Leijen et al. | |
| 2010/0333091 A1 * | 12/2010 | Lin et al. | 718/100 |
| 2011/0078703 A1 * | 3/2011 | Dokovski et al. | 719/315 |
| 2011/0154346 A1 * | 6/2011 | Jula | 718/103 |
| 2011/0246727 A1 * | 10/2011 | Dice et al. | G06F 12/0261 711/150 |

* cited by examiner

*Primary Examiner* — Tammy Lee
(74) *Attorney, Agent, or Firm* — Artegis Law Group, LLP (57) ABSTRACT

One embodiment of the present invention sets forth a technique for managing the allocation and release of resources during multi-threaded program execution. Programmable reference counters are initialized to values that limit the amount of resources for allocation to tasks that share the same reference counter. Resource parameters are specified for each task to define the amount of resources allocated for consumption by each array of execution threads that is launched to execute the task. The resource parameters also specify the behavior of the array for acquiring and releasing resources. Finally, during execution of each thread in the array, an exit instruction may be configured to override the release of the resources that were allocated to the array. The resources may then be retained for use by a child task that is generated during execution of a thread.

20 Claims, 8 Drawing Sheets

COMPUTE WORK DISTRIBUTION REFERENCE COUNTERS

BACKGROUND OF THE INVENTION

Field of the Invention

The present invention generally relates to program execution and more specifically architectural resource management for program execution.

Description of the Related Art

Execution of programs typically requires allocation of processing and storage resources for processing data and storing intermediate results and outputs. Because the architectural resources are limited, the amount of resources allocated to each program is tracked to ensure that the resources in a resource pool are not overallocated. When a program completes execution, the allocated resources are released and returned to the resource pool.

When multi-threaded program execution is supported with context switching, the state data maintained for each execution thread is stored to perform a context switch. The memory required to store the state data is an additional resource that must also be allocated to ensure that the state data can be stored.

Accordingly, what is needed in the art is a system and method for improved allocation and release of resources during multi-threaded execution.

SUMMARY OF THE INVENTION

A system and method for managing the allocation and release of resources during multi-threaded program execution initializes programmable reference counters to values that limit the amount of resources for allocation to processing tasks that share the same reference counter. Resource parameters are specified for each task to define the amount of architectural resources allocated for consumption by each array of execution threads that is launched to execute the task. The resource parameters also specify the behavior of the array for acquiring and releasing resources. Finally, during execution of each thread in the array when a child task is generated, an exit instruction may be configured to override the release of the resources that were allocated to the array. The override ensures that the architectural resources are retained for use by a continuation task that is also generated.

Various embodiments of a method of the invention for allocating and releasing architectural resources in a multi-threaded system includes allocating the architectural resources to thread array including a plurality of threads to execute a processing task and determining by each thread in the thread array, during execution of the processing task, whether a release of the architectural resources will be overridden when the thread array exits. The architectural resources are released when the thread array exits and no thread in the array of threads determined that the release of the architectural resources would not be overridden. The architectural resources are retained when the thread array exits and at least one thread in the thread array determined that the release of the architectural resources would be overridden.

Various embodiments of the invention include a multi-threaded system configured to allocate and release architectural resources. The multi-threaded system comprises a memory, a general processing cluster, and a work distribution unit. The memory is configured to store program instructions corresponding to a processing task. The general processing cluster is configured to process a first thread array including a plurality of threads to execute the processing task, where, during execution of the processing task, each thread of the first thread array determines whether a release of the architectural resources will be overridden when the first thread array exits. The work distribution unit is coupled to the general processing cluster and configured to allocate the architectural resources to the first thread array, release the architectural resources when the first thread array exits and no thread in the first thread array determined that the release of the architectural resources would not be overridden, and retain the architectural resources when the first thread array exits and at least one thread in the first thread array determined that the release of the architectural resources would be overridden.

When a child task is generated, execution of the parent task is suspended and the continuation task is generated. After execution of the child task completed, the continuation task is executed using the architectural resources allocated to the parent task. Upon exiting, the continuation task releases the architectural resources originally allocated to the parent task. The architectural resources are not overallocated and the quantity of resources that is available for allocation may be managed through the resource parameters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
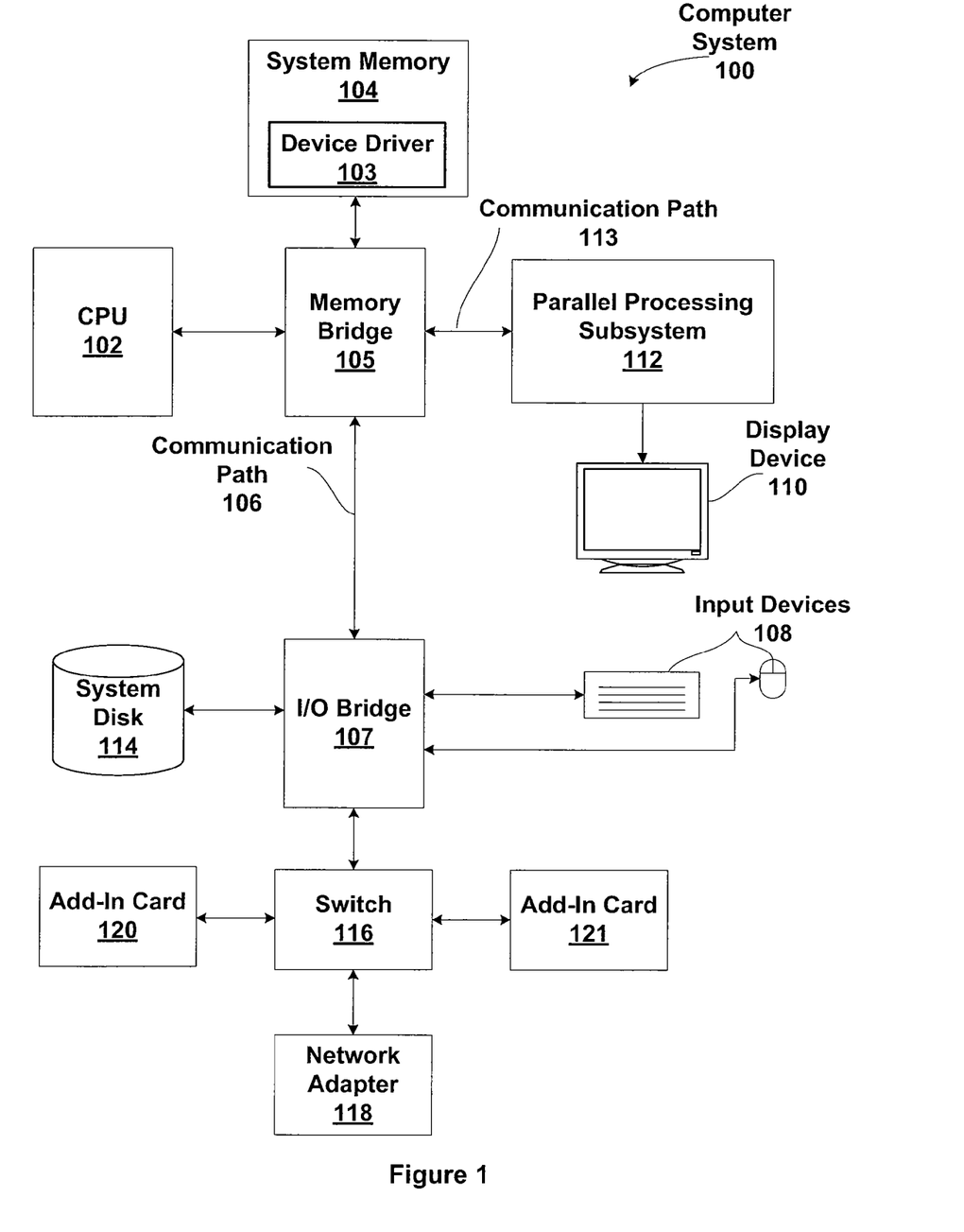
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
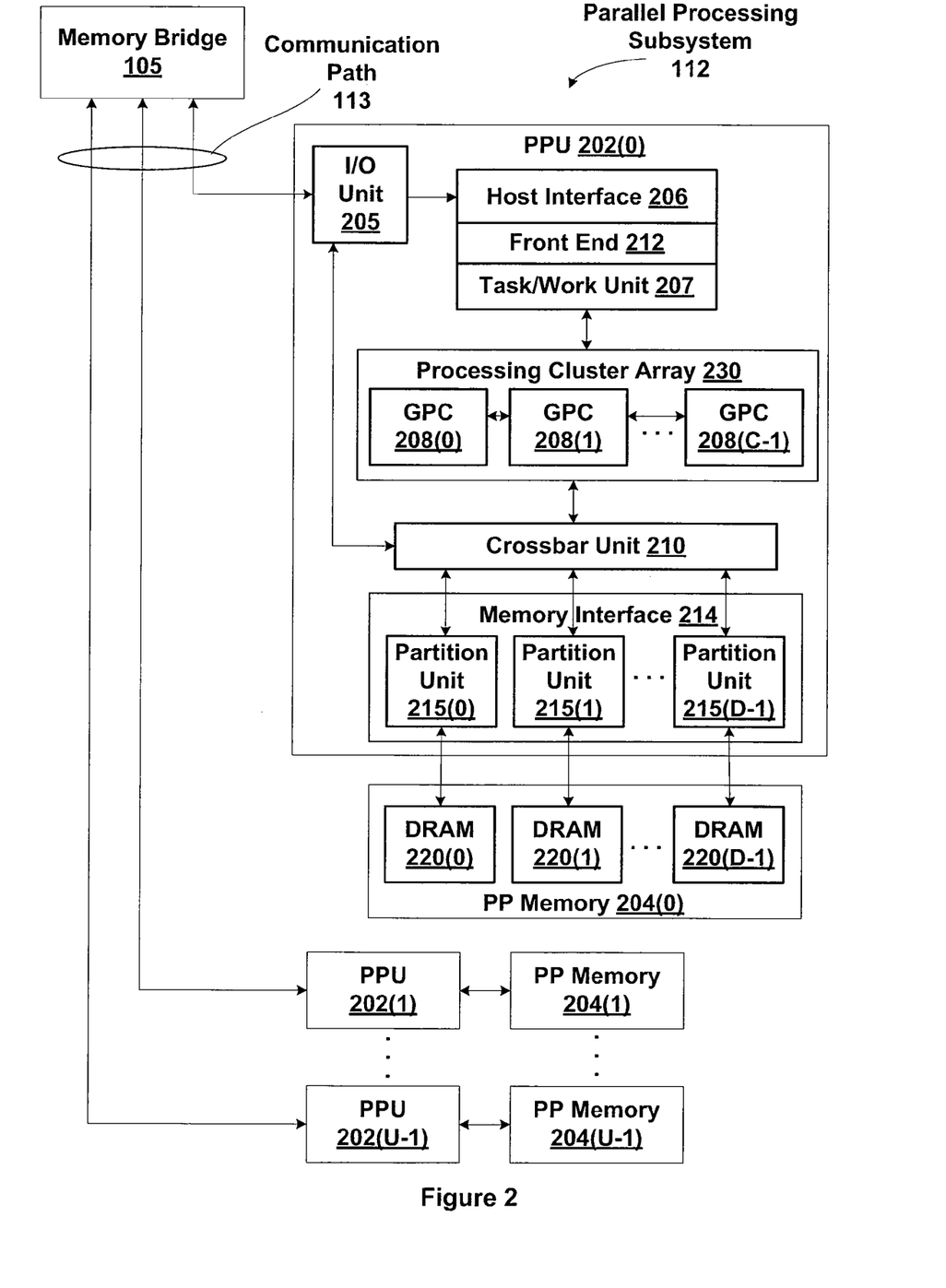
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to compute processing tasks that are encoded as task metadata (TMD) and stored in memory. The task pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for the linked list, thereby providing another level of control over priority.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
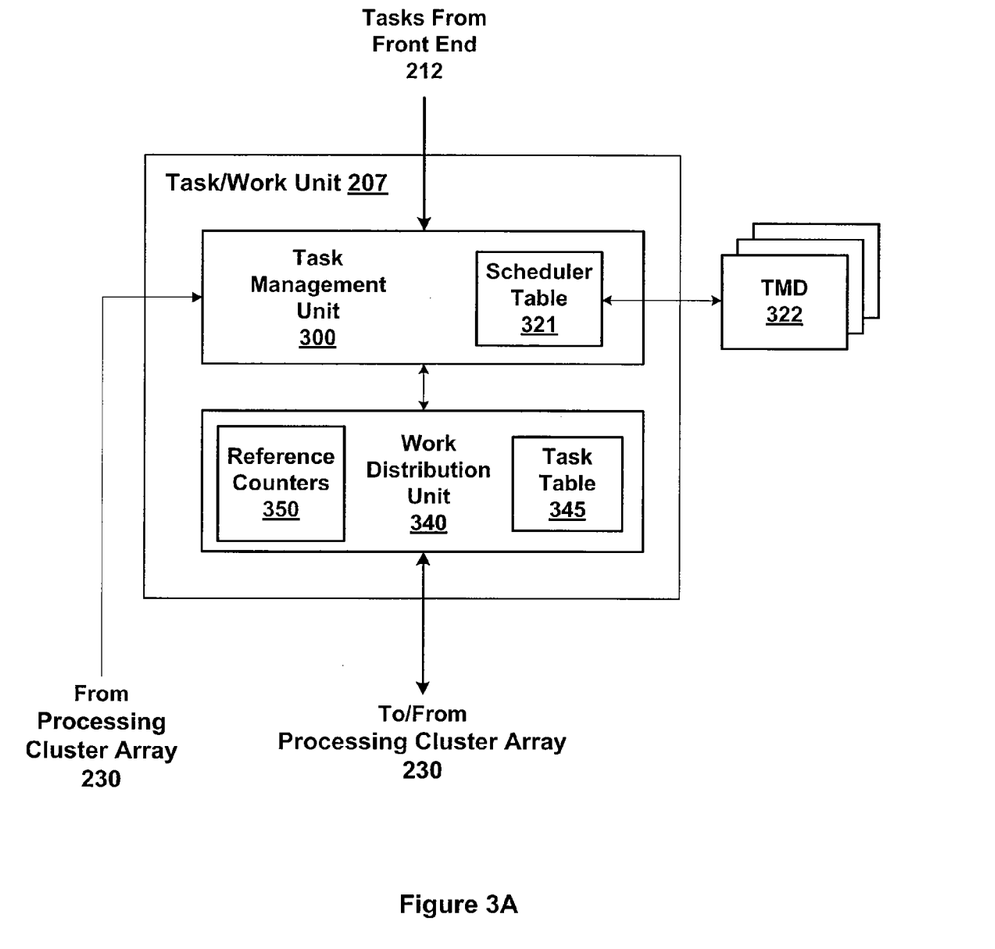
FIG. 3A is a block diagram of the Task/Work Unit of FIG. 2, according to one embodiment of the invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of task pointers to the TMDs 322 corresponding to the tasks in the scheduler table 321, where the list can be implemented with a linked list, and hereinafter a linked list is assumed. The TMDs 322 are metadata representing a task, such as configuration data and state information needed to execute the task. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a child processing task is generated, the child processing task is added to a linked list in the scheduler table 321. A task is removed from a slot when the task is evicted.

The work distribution unit 340 also includes compute work distribution (CWD) reference counters 350 that are used to track the available resources needed for processing a task. The reference counters are initialized to limit the maximum amount of resources that may be consumed. As tasks are launched by the work distribution unit 340 for execution by the GPCs 208, the reference counters are updated to indicate the amount of resources that are available after the task is launched, thereby accounting for the portion of the resource consumed by the task. The resources may be memory storage, processing resources, number of threads, or any other quantifiable architectural resource that may be consumed by a task. Each TMD 322 specifies a particular reference counter and a value indicating the amount of resources that are needed (or may be needed) by the task. Before launching the task, the work distribution unit 340 checks that the value is not greater than the reference counter specified by the TMD 322. When a task is launched, the work distribution unit 340 updates the specified reference counter so that the value of resources allocated to the task is unavailable. As tasks are completed, the resources allocated to the task are released and the reference counters 350 are updated accordingly. Use and updating of the reference counters 350 is described in greater detail in conjunction with FIGS. 4A, 4B, 5A, and 5B. In one embodiment, a plurality of reference counters are specified in each TMD 322, along with associated counter values, thereby accounting for two or more architectural resources.

Task Processing Overview

Figure 3B:
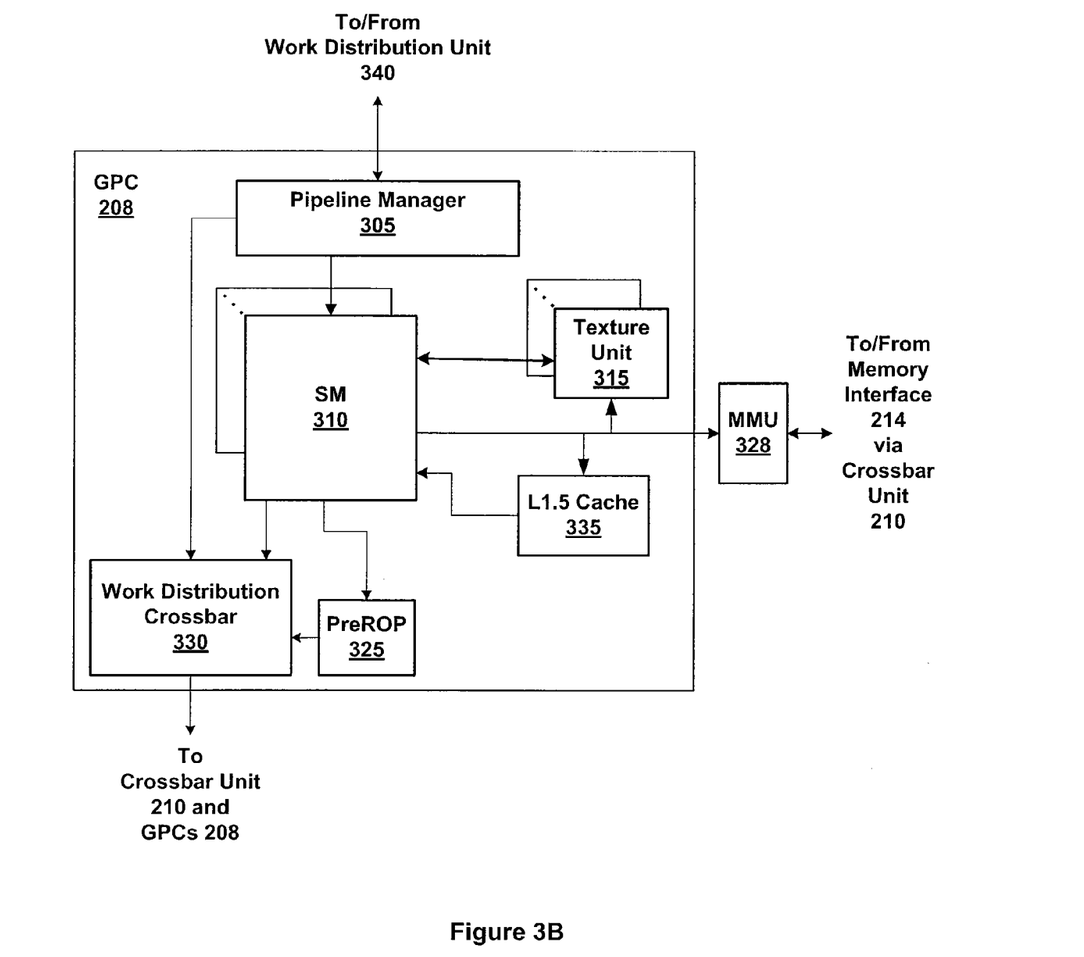
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1 each SM 310 configured to process one or more thread groups. Also, each SM 310 advantageously includes an identical set of functional execution units that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Compute Work Distribution Reference Counters

A TMD 322 encapsulates the metadata for a processing task, including grid dimensions. The grid dimensions (n,m), where n and m are integers, specify the number of CTAs that are executed to process the task. For example, grid dimensions 1,1 specify a single CTA and grid dimensions 2,1 or 1,2 specify two CTAs. Grids may have more than two dimensions, and all dimension sizes are specified in the TMD. Each CTA requires some architectural resources for execution. The reference counters 350 provide a mechanism for preventing the overallocation of the architectural resources. Each reference counter 350 may represent a single architectural resource or a combination of two or more architectural resources. The architectural resources may include a portion of shared memory, local memory, registers, CTA identifiers, thread groups, and threads. An architectural resource may also include a barrier counter that is used to track synchronization of different CTAs following execution of a barrier instruction by a thread. A separate barrier counter is needed to track the different threads as they each reach a barrier instruction. A limited number of barrier counters are available; therefore, the barrier counters are an architectural resource.

A continuation slot is another architectural resource that is allocated for tasks. As previously explained, a processing task may generate one or more "child" processing tasks during execution. When a child processing task is generated by at least one thread during execution of a CTA, the resources allocated for the CTA are not released. Instead, execution of the CTA is suspended while the child task is executed using architectural resources allocated to the child task. A continuation task is generated to complete execution of the CTA after execution of the child task completes. The continuation task is represented by a TMD 322 and consumes a continuation slot. The child task does not consume architectural resources allocated for the parent CTA. Conversely, the parent CTA does not consume architectural resources allocated for the child task.

The task/work unit 207 suspends execution of the parent CTA that generated the child task, and dynamically schedules the child processing task at a higher priority level compared with the priority level of the parent CTA. The higher priority is specified so that execution of the child processing task will complete quickly compared with any other CTAs launched for the same tasks as the parent CTA. Typically, the child task is generated to compute data that the parent CTA is dependent on. When execution of the parent CTA is suspended, the state of the parent CTA is unloaded from the GPCs 208 and stored. Execution of the parent CTA may resume at a later time. Continuation slots are allocated for storing TMDs 322 that represent the state information needed to resume execution of the parent CTA.

When demand paging for memory is not supported, all memory for continuation slots must be reserved in advance at the time that the work distribution unit 340 launches a CTA for the task. For a given processing task, a specified number of continuation slots needed for each CTA should be available as a prerequisite to launching the CTA, otherwise the state of the CTA may not be able to be saved and subsequently restored. Because the continuation slot usage is known only to the software runtime that generates the tasks, the work distribution unit 340 cannot track continuation slot requirements without assistance from the software runtime. The software runtime programs the number of continuation slots that are needed into the TMD 322. In one embodiment a delta value that is included as a resource parameter represents the number of continuation slots.

Additionally, a child task may also be a parent task that generates one or more child tasks that will also each need a continuation slot in order to execute successfully. In order to guarantee that each child task has enough continuation slots to complete, a child task is allocated a continuation slot from a different pool of continuation slots than the parent task. Thus, there are multiple pools of continuation slots included in the architectural resources.

The reference counters 350 are initialized to specific values prior to execution of the processing tasks. In one embodiment, a separate reference counter 350 is used for each different priority level that may be specified for a TMD 322. The reference counters 350 may be initialized to M*P to limit each of the M SMs 310 to run a specific number (P) of CTAs concurrently. Alternatively, the reference counters 350 may be initialized to limit the number of thread groups running concurrently. Because each thread executed for a CTA can generate a child task, the number of continuation slots may be computed based on the number of different priority levels and the number of concurrent CTAs (or the number of concurrent thread groups).

The resource parameters specified in a TMD 322 for a processing task are shown in TABLE 1.

TABLE 1

| Resource parameters |
|---|
| Task |
| Grid (n,m) |
| Ref Count ID |
| dec_enable |
| Inc_enable |
| Delta |

The grid dimensions are specified and may be used to determine the number of CTAs that are executed for the task. The RefCountID is an identifier for one of the reference counters 350, where a reference counter indicates a number of available resources. A dec_enable flag is an allocation enable flag that enables decrementing the reference counter when a CTA is launched for the task. An inc_enable flag is an allocation release enable flag that enables incrementing the reference counter when execution of a CTA is completed for the task. In other words, the dec_enable and inc_enable flags control allocation and deallocation of resources for the task. The inc_enable flag may be overridden by an EXIT instruction when a thread of a CTA sets a bit to specify that the EXIT instruction is an EXIT.KEEPREFCOUNT instruction. When the EXIT instruction is an EXIT.KEEPREFCOUNT instruction, the resources allocated for execution of the CTA are retained when the CTA exits and the reference counter is maintained and not updated or changed.

The delta value is the amount by which the reference counter is decremented or incremented. In other embodiments, the reference counters may indicate the number of resources that have been allocated instead of the number of resources that are available, so that a reference counter is incremented when a CTA is launched and decremented when a CTA is completed.

The resource parameters for the task may be specified differently for different tasks as shown in TABLE 2.

TABLE 2

| | Dec_enable | Inc_enable | EXIT.KEEPREFCOUNT |
|---|---|---|---|
| Allocate/Deallocate | True | True | False |
| Allocate/Deallocate parent task | True | True | True |
| Allocate only | True | False | X |
| Deallocate only continuation task | False | True | False |
| Deallocate disabled | False | True | True |
| No allocate/deallocate | False | False | X |

Figure 4A:
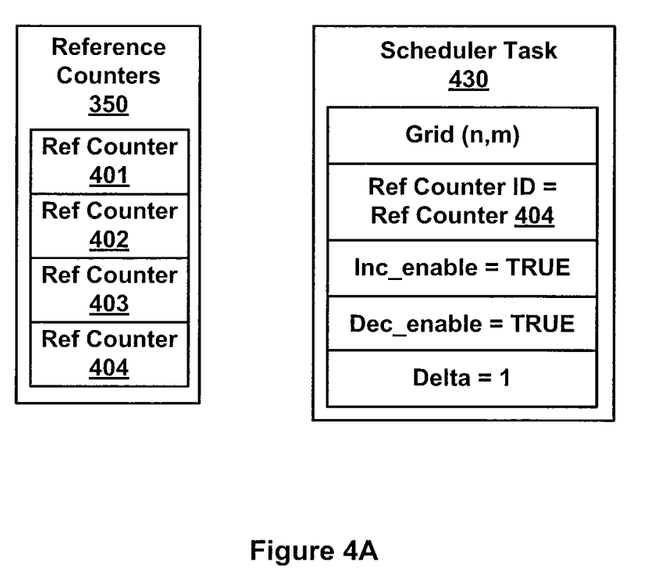
FIG. 4A illustrates the reference counters of FIG. 3A and resource related parameters of a scheduler task, according to one embodiment of the invention.

For example, a task intended to allocate and deallocate resources will have dec_enable and inc_enable set TRUE. When EXIT.KEEPREFCOUNT is FALSE, as shown in the first row of TABLE 2, the resources are released. When EXIT.KEEPREFCOUNT is set to TRUE during execution of the CTA, as shown in the second row of TABLE 2, the task may be a parent task and the allocated resources are not released. The EXIT.KEEPREFCOUNT function is described in further detail in conjunction with FIG. 4.

When a computing task is configured only to allocate architectural resources and not to release the allocated architectural resources, the dec_enable is set TRUE and inc_enable is set FALSE, as shown in the third row of TABLE 2. A continuation task is configured to deallocate the resources allocated by the parent task. A continuation task has dec_enable set FALSE and inc_enable set TRUE, and EXIT.KEEPREFCOUNT is not set TRUE during execution of the continuation task (assuming no child task is generated), as shown in the fourth row of TABLE 2. When a continuation task that is configured only to deallocate architectural resources and not to allocate architectural resources generates a child task during execution, the deallocation of the architectural resources is overridden by setting EXIT.KEEPREFCOUNT TRUE, as shown in the fifth row of TABLE 2. When a processing task is configured to neither allocate nor deallocate architectural resources the dec_enable and inc_enable are set FALSE, as shown in the last row of TABLE 2.

FIG. 4A illustrates the reference counters 350 of FIG. 3A and resource related parameters of a scheduler task 430, according to one embodiment of the invention. The reference counters 350 stores an array of reference (ref) counters including ref counter 401, 402, 403, and 404. The scheduler task 430 is configured to have a high priority level and only single scheduler CTA is executed at a time. The scheduler task is responsible for determining when a grid has completed execution and for initiating launches of continuation tasks.

The scheduler task 430 specifies a grid(n,m) and the reference counter identifier (ID) of reference counter 404. Inc_enable and dec_enable are both TRUE and the delta is set to 1. The reference counter 404 is initialized to one, equal to the delta so that only a single CTA may execute at a time. Therefore, execution of the scheduler task 430 is serialized. When the scheduler task 430 launches a first CTA, the reference counter 404 is decremented by one to a value of zero. When execution of the CTA completes, the reference counter 303 is incremented from zero to a value of one and a second CTA may be launched for the scheduler task 430. The reference counter 404 should not be specified by any other tasks to ensure that the scheduler task 430 may always have one CTA executing.

In sum, the programmable reference counters 350 are initialized to values that limit the amount of resources for allocation to tasks that specify the same reference counter. The resource parameters that are specified for each task define the amount of resources allocated for consumption by each CTA that is launched to execute a task. The resource parameters also specify the behavior of a CTA for acquiring and releasing resources. Finally, the EXIT instruction may be configured at runtime to override the release of the resources allocated to a CTA.

Figure 4B:
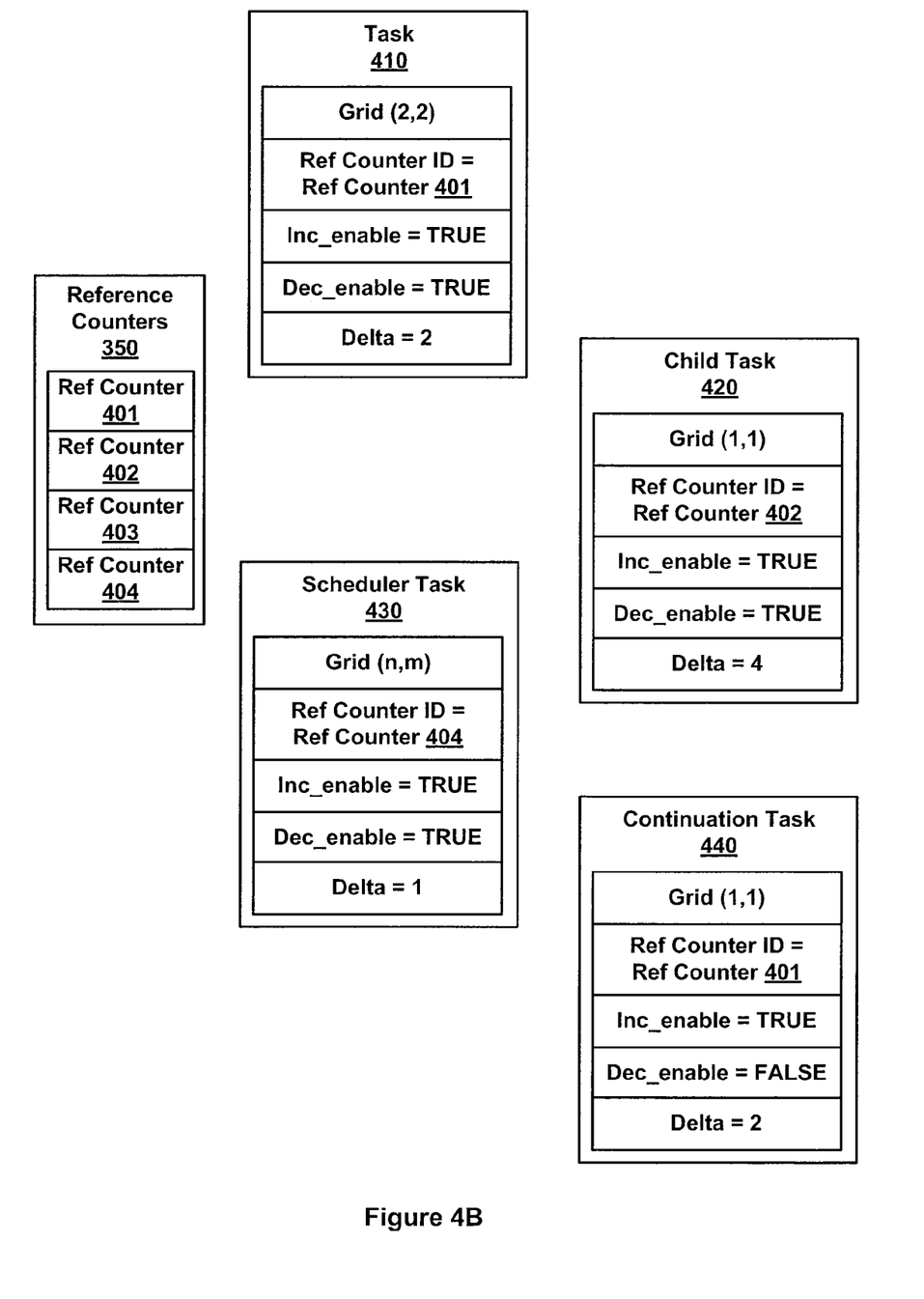
FIG. 4B illustrates the references counters of FIG. 3A and resource related parameters of different tasks, according to one embodiment of the invention.

FIG. 4B illustrates the reference counters 350 of FIG. 3A and resource related parameters of different tasks, according to one embodiment of the invention. In addition to the reference counters 350 and the scheduler task 430, FIG. 4B illustrates task 410 that is a parent task, a child task 420, and a continuation task 440 that is generated by the parent task 410. The task 410 specifies a grid(2,2) so that four CTAs will execute and the reference counter ID of reference counter 401. Inc_enable and dec_enable are both TRUE and the delta is set to two. The reference counter 401 is initialized to four, twice the delta value, so that two CTAs may execute concurrently. When the scheduler task 430 launches a first CTA, the reference counter 404 is decremented by two to a value of two. When the scheduler task 430 launches a second CTA, the reference counter 404 is decremented by two to a value of zero.

During execution, a thread of the first CTA generates the child task 420. One or more threads of the first CTA may execute a code path that results in the generation of a child task. Typically, further execution of the first CTA is dependent on execution of the child task(s) generated by the first CTA. When at least one thread of the first CTA generates a child task, a "sticky" bit is set to ensure that the EXIT instruction at the end of the code for the first CTA is executed as an EXIT.KEEPREFCOUNT so that the resources allocated to the first CTA are retained and not released. The sticky feature of the KEEPREFCOUNT allows for the different threads of a CTA to exit without synchronizing to each other at the EXIT instruction. Therefore, idle cycles are not incurred by the threads that reach the EXIT instruction earlier than other threads in the CTA.

The resources allocated to the first CTA include a continuation slot, i.e., memory needed to store the execution state of the first CTA in a TMD 322 that represents the continuation task 440. Therefore, the EXIT.KEEPREFCOUNT overrides the inc_enable being set to TRUE that would ordinarily release the allocated resources for the first CTA when the first CTA exits. Importantly, the EXIT instruction may be dynamically configured to not release the resources (by appending .KEEPREFCOUNT) for a CTA during execution of the CTA threads. In contrast, the resource parameters, e.g., grid, inc_enable, dec_enable, delta, and ref counter, are initialized or changed when no CTAs are executing for the task.

The continuation task 440 is generated by software runtime as a continuation of the first CTA when the last CTA of the child task completes execution and exits or when the scheduler task is executed. During execution, other CTAs, such as the second CTA may also generate one or more child tasks that then cause corresponding continuation tasks to be generated. The continuation task 440 executes at a later time to complete execution of the first CTA. Upon exiting, the continuation task 440 releases the resources originally allocated to the first CTA. Therefore, the continuation task 440 specifies a grid(1,1) so that a single CTA that continues the first CTA of the task 410 will execute. The same reference counter ID as used by the first CTA, so reference counter 401 is specified for the continuation task 440. Inc_enable is TRUE so that the resources allocated to the first CTA will be released, unless overridden by the EXIT.KEEPREFCOUNT due to generation of another child task. The dec_enable is set FALSE so that resources in addition to those allocated for the first CTA are not allocated for the continuation task 440. The delta is set to two, matching the delta of the parent task 410.

The scheduler task 430 enables the launching of the continuation task 440 to resume execution of the first CTA by monitoring dependencies of the first CTA, such as completion of the child task 420. When the CTA for the continuation task 440 completes execution (assuming no child task is generated), the ref counter 401 is incremented by the delta, increasing the ref counter 401 by two. This allows another CTA for the task 410 to launch. Similarly, when the second CTA completes execution (assuming no child task is generated for the second CTA), the ref counter 401 is incremented by the delta, allowing another CTA for the task 410 to launch.

Figure 5A:
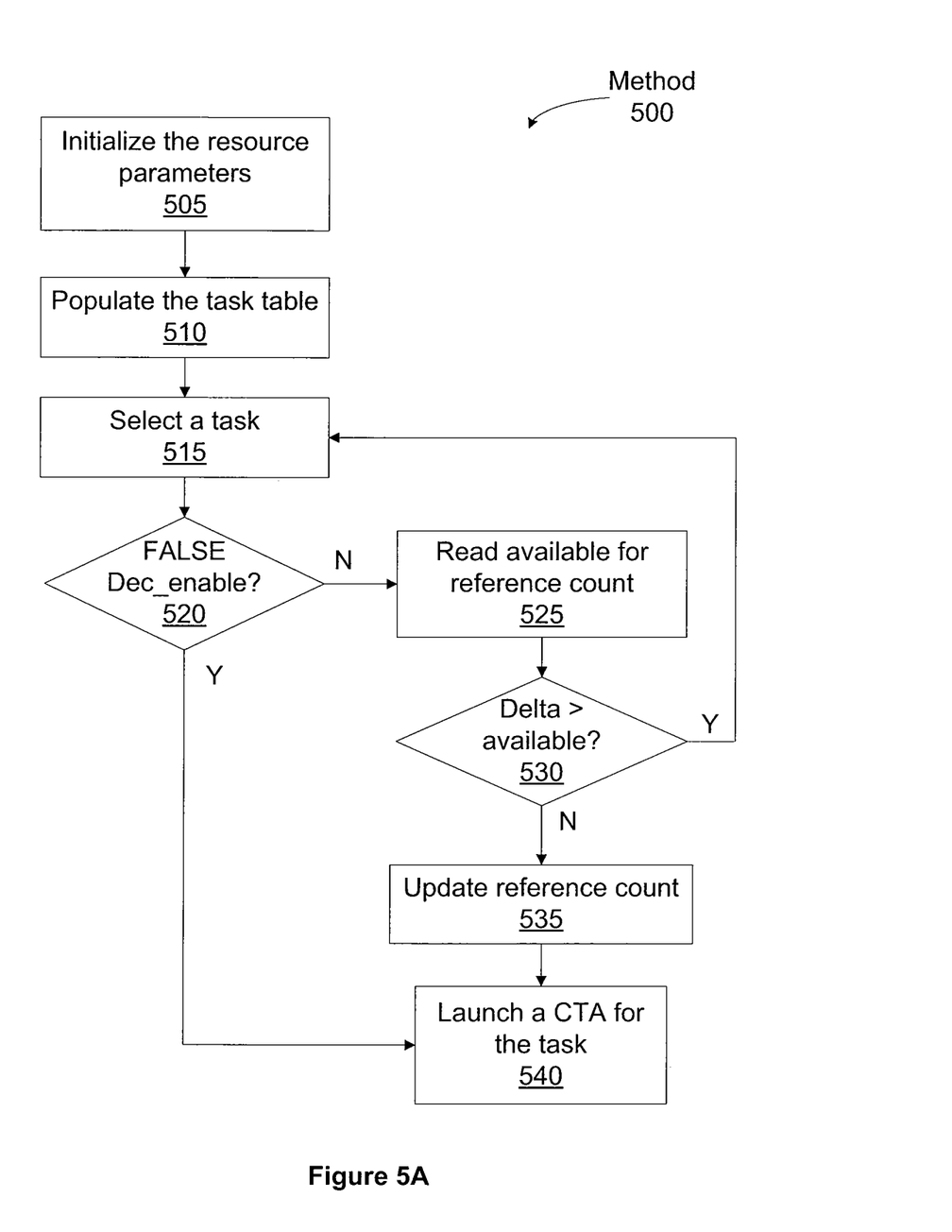
FIG. 5A illustrates method for managing architectural resources when tasks are launched, according to one embodiment of the invention.

FIG. 5A illustrates method 500 for managing architectural resources when tasks are launched, according to one embodiment of the invention. Although the method steps are described in conjunction with the systems of FIGS. 1, 2, 3A, and 3B, persons skilled in the art will understand that any system configured to perform the method steps, in any order, is within the scope of the inventions.

At step 505 the architectural resource parameters for a task are initialized. At step 510 the task table 345 is populated with processing tasks to be executed. Note, that continuation tasks will be stored in the task table 345 by the scheduler task 430 as entries become available and as any dependencies that prevent execution of a continuation task are resolved.

At step 515 the work distribution unit 340 selects a processing task from the task table 345 for execution. At step 520 the work distribution unit 340 determines if the dec_enable resource parameter for the selected task is set to FALSE, and, if so, then at step 540 the work distribution unit 340 launches a CTA for the selected task. Otherwise, at step 525 the work distribution unit 340 reads the ref counter specified by the selected task to obtain the value indicating the available architectural resources. At step 530 the work distribution unit 340 determines if the delta value specified by the selected task is greater than the value indicating the available architectural resources, and, if so, then enough architectural resources are not available for allocation to the selected task and the work distribution unit 340 returns to step 515 to select a different task.

Otherwise, at step 535 the work distribution unit 340 updates the value indicating the available architectural resources, e.g., decrements the ref count by delta, to reduce the available architectural resources. Note that the decrement operation should be an atomic operation because the same ref counter may also be simultaneously updated to release allocated architectural resources. At step 540 the work distribution unit 340 launches a CTA for the selected task. When a task is not eligible to launch a CTA due to a shortage of architectural resources at step 530, the work distribution unit 340 may remove the task from the task table 345 to replace the task with a different task or equal or higher priority.

Figure 5B:
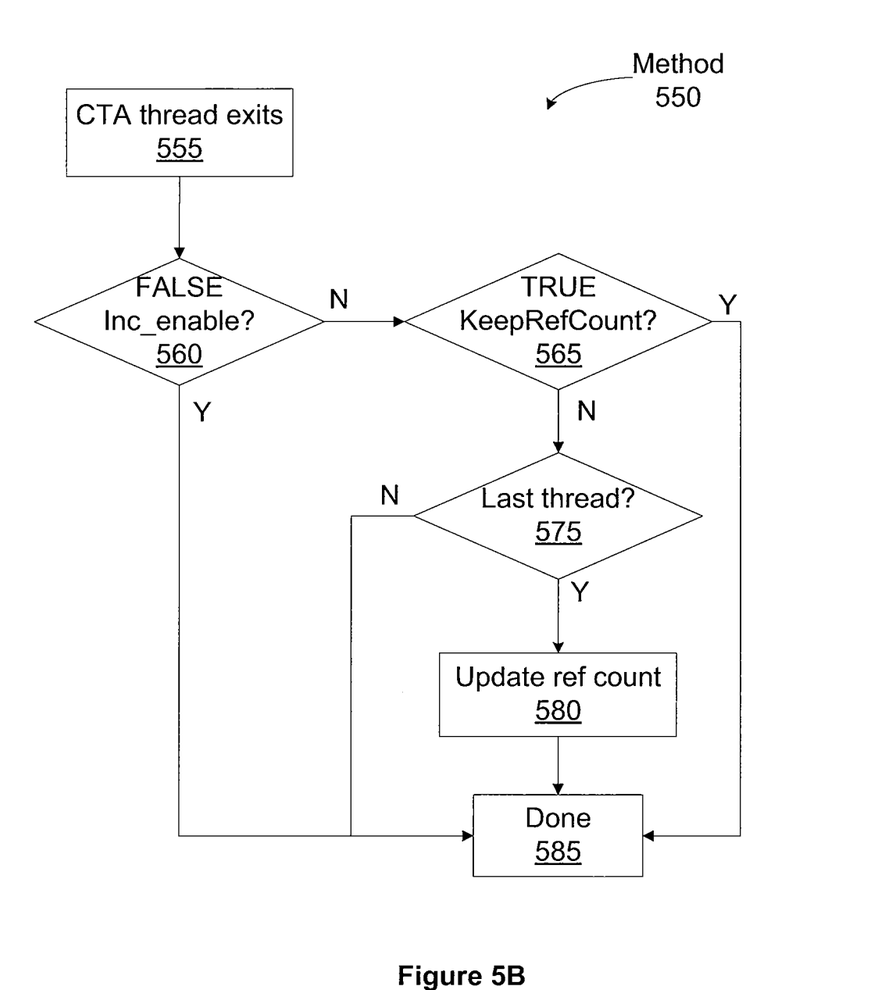
FIG. 5B illustrates a method for managing architectural resources when execution exits, according to one embodiment of the invention.

FIG. 5B illustrates a method 550 for managing architectural resources when an exit instruction is reached, according to one embodiment of the invention. Although the method steps are described in conjunction with the systems of FIGS. 1, 2, 3A, and 3B, persons skilled in the art will understand that any system configured to perform the method steps, in any order, is within the scope of the inventions.

At step 555 a CTA thread for a task reaches an exit instruction. At step 560 the thread determines if inc_enable is FALSE, and, if so, then at step 585 execution of the thread is complete. Otherwise, at step 565 the thread determines if KEEPREFCOUNT is TRUE. If, the thread or another thread of the CTA generated a child task during execution the KEEPREFCOUNT will be set to TRUE. When at step 565 the KEEPREFCOUNT is TRUE, at step 585 execution of the thread is complete. Otherwise, when KEEPREFCOUNT is FALSE, the thread determines if it is that last thread for the CTA, and, if so, at step 580 the reference count is updated to release the resources allocated to the CTA. Note that the increment operation should be an atomic operation because the same ref counter may also be simultaneously updated to allocate architectural resources. At step 585 execution of the thread is complete.

The ability to dynamically control of the release of architectural resources through the KEEPREFCOUNT enables a processing task to perform one or more levels of nested parallelism. However, the continuation slots that may be needed during processing of a task need to be allocated when each CTA for a task is launched to ensure that more architectural resources than are available are not consumed. Therefore, the resource parameters may represent one or more architectural resources. Also, the ability to suspend execution of a CTA enables context switching at the individual task level without unloading or draining state information for all of the processing tasks that are executing from the GPCs 208.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of allocating and releasing architectural resources in a multi-threaded system, the method comprising:
    allocating the architectural resources to a first thread array including a first plurality of threads to execute a parent processing task;
    determining, by one or more threads included in the first plurality of threads and during execution of the parent processing task, whether a release of the architectural resources is to be overridden when a first thread included in the first plurality of threads has exited based on the existence of a child processing task generated from the parent processing task and associated with at least one thread included in the first plurality of threads;
    releasing the architectural resources when the first thread has exited and no thread included in the first plurality of threads has determined that the release of the architectural resources is to be overridden; and
    retaining the architectural resources when the first thread has exited and at least one of the one or more threads included in the first plurality of threads has determined that the release of the architectural resources is to be overridden.

2. The method of claim 1, wherein a second thread included in the first plurality of threads generates the child processing task during execution of the parent processing task and determines that the release of the architectural resources is to be overridden when the first thread has exited.

3. The method of claim 2, further comprising allocating additional architectural resources for the child processing task from a separate pool that does not include the architectural resources allocated to the first thread array.

4. The method of claim 2, further comprising generating a continuation task configured to complete the parent processing task executed by the first thread and release the architectural resources allocated to the first thread array.

5. The method of claim 4, wherein the continuation task consumes at least a portion of the architectural resources allocated to the first thread array.

6. The method of claim 4, wherein execution of the continuation task begins after execution of the child processing task is complete.

7. The method of claim 1, further comprising initializing a reference counter that limits a maximum quantity of architectural resources in a pool that are available for allocation.

8. The method of claim 7, wherein resource parameters are specified by the parent processing task, and the resource parameters include a delta value indicating a quantity of the architectural resources needed for the first thread array.

9. The method of claim 8, further comprising determining, before allocating the architectural resources to the first thread array, that the delta value is not greater than the reference counter.

10. The method of claim 8, wherein the resource parameters include an allocation enable flag, and further comprising updating the reference counter based on the delta value when the allocation enable flag is asserted.

11. The method of claim 8, wherein the resource parameters include an allocation release enable flag, and further comprising not updating the reference counter when the allocation release enable flag is negated.

12. The method of claim 8, wherein the resource parameters include an allocation release enable flag, and further comprising not updating the reference counter when the allocation release enable flag is asserted and the at least one thread included in the first plurality of threads determined that the release of the architectural resources would be overridden.

13. The method of claim 7, wherein the reference counter represents a combination of different architectural resources including a number of barrier counters.

14. A non-transitory computer-readable storage medium storing instructions that, when executed by a processor, cause the processor to allocate and release architectural resources in a multi-threaded system, by performing the steps of:
 allocating the architectural resources to a first thread array including a first plurality of threads to execute a parent processing task;
 determining, by one or more threads included in the first plurality of threads and during execution of the parent processing task, whether a release of the architectural resources is to be overridden when a first thread included in the first plurality of threads has exited based on the existence of a child processing task generated from the parent processing task and associated with at least one thread included in the first plurality of threads;
 releasing the architectural resources when the first thread has exited and no thread included in the first plurality of threads has determined that the release of the architectural resources is to would be overridden; and
 retaining the architectural resources when the first thread has exited and at least one of the one or more threads included in the first plurality of threads has determined that the release of the architectural resources is to be overridden.

15. The non-transitory computer-readable storage medium of claim 14, wherein a second thread included in the first plurality of threads generates the child processing task during execution of the parent processing task and determines that the release of the architectural resources is to be overridden when the first thread has exited.

16. The non-transitory computer-readable storage medium of claim 14, further comprising initializing a reference counter that limits a maximum quantity of architectural resources in a pool that are available for allocation.

17. A multi-threaded system configured to allocate and release architectural resources, comprising:
 a memory configured to store program instructions corresponding to a parent processing task;
 a general processing cluster configured to process a first thread array including a first plurality of threads to execute the parent processing task, wherein, during execution of the parent processing task, one or more threads included in the first plurality of threads determines whether a release of the architectural resources is to be overridden when a first thread included in the first plurality of threads has exited based on the existence of a child processing task generated from the parent processing task and associated with at least one thread included in the first plurality of threads;
 a work distribution unit coupled to the general processing cluster and configured to:
  allocate the architectural resources to the first thread array;
  release the architectural resources when the first thread has exited and no thread included in the first plurality of threads has determined that the release of the architectural resources is to be overridden; and
  retain the architectural resources when the first thread has exited and at least one of the one or more threads included in the first plurality of threads has determined that the release of the architectural resources is to be overridden.

18. The multi-threaded system of claim 17, wherein a second thread included in the first thread array generates the child processing task during execution of the parent processing task and determines that the release of the architectural resources is to be overridden when the first thread has all included exited.

19. The multi-threaded system of claim 17, wherein the work distribution unit is further configured to initialize a reference counter that limits a maximum quantity of architectural resources in a pool that are available for allocation.

20. The multi-threaded system of claim 19, wherein the reference counter represents a combination of different architectural resources.

* * * * *

UNITED STATES PATENT AND TRADEMARK OFFICE
CERTIFICATE OF CORRECTION

PATENT NO. : 9,507,638 B2
APPLICATION NO. : 13/291369
DATED : November 29, 2016
INVENTOR(S) : Philip Alexander Cuadra et al.

Page 1 of 1

It is certified that error appears in the above-identified patent and that said Letters Patent is hereby corrected as shown below:

In the Claims

Column 17, Claim 14, Line 53, please delete "would";

Column 18, Claim 18, Line 47, please delete "all included".

Signed and Sealed this
Eleventh Day of April, 2017

Michelle K. Lee
*Director of the United States Patent and Trademark Office*